United States Patent
Sorensen et al.

(10) Patent No.: US 9,176,948 B2
(45) Date of Patent: Nov. 3, 2015

(54) CLIENT/SERVER-BASED STATISTICAL PHRASE DISTRIBUTION DISPLAY AND ASSOCIATED TEXT ENTRY TECHNIQUE

(75) Inventors: Jeffrey Sorensen, New York, NY (US); Megan Teresa Ghastin, Canton, MI (US); Ananya Misra, New York, NY (US); Ravindran Rajakumar, Brooklyn, NY (US); Julia Anna Maria Neidert, Prior Lake, MN (US)

(73) Assignee: Google Inc., Mountain View, CA (US)

( * ) Notice: Subject to any disclaimer, the term of this patent is extended or adjusted under 35 U.S.C. 154(b) by 891 days.

(21) Appl. No.: 13/430,887

(22) Filed: Mar. 27, 2012

(65) Prior Publication Data
US 2015/0154175 A1 Jun. 4, 2015

(51) Int. Cl.
*G06F 17/27* (2006.01)
(52) U.S. Cl.
CPC .................... *G06F 17/276* (2013.01)
(58) Field of Classification Search
None
See application file for complete search history.

(56) References Cited

U.S. PATENT DOCUMENTS

| | | | |
|---|---|---|---|
| 6,484,136 B1 | 11/2002 | Kanevsky et al. | |
| 7,502,786 B2 | 3/2009 | Liu et al. | |
| 9,026,426 B2* | 5/2015 | Wu et al. | 704/8 |
| 2012/0029910 A1* | 2/2012 | Medlock et al. | 704/9 |
| 2012/0296635 A1* | 11/2012 | Brockett et al. | 704/9 |
| 2014/0310213 A1* | 10/2014 | Badger et al. | 706/12 |

OTHER PUBLICATIONS

Wattenberg, Martin et al., "The Word Tree, an Interactive Visual Concordance," IBM Research, Oct. 2008, 8 pages.

* cited by examiner

*Primary Examiner* — Shirley Zhang
(74) *Attorney, Agent, or Firm* — Remarck Law Group PLC (57) ABSTRACT

A computer-implemented technique for client/server-based statistical phrase distribution display and text entry includes transmitting a portion of an input entered by a user from a client device to a server having a language model. The input includes a text word or a speech input. The technique further includes receiving responses generated by the language model based on the portion of the input, where each of the responses includes words likely to follow the input, and displaying a tree structure that includes the responses arranged into a plurality of levels. Words in a first portion of each of the responses are included in a first level and are shown on the display. Words in a second portion of each of the responses are included in a second level and subsequent levels and are not shown on the display.

20 Claims, 6 Drawing Sheets

CLIENT/SERVER-BASED STATISTICAL PHRASE DISTRIBUTION DISPLAY AND ASSOCIATED TEXT ENTRY TECHNIQUE

FIELD

This disclosure relates to techniques for client/server-based statistical phrase distribution display and text entry.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Searching information on the Internet typically involves typing one or more words in a search bar of a search engine. Generally, as a user types a character of a word in the search bar, the search engine provides one or more predicted suggestions below the search space that may complete a term or phrase to be searched. The predicted suggestions are often insufficient to complete a phrase or a sentence. Consequently, text cannot be rapidly entered using the predicted suggestions.

SUMMARY

A computer-implemented technique includes receiving, via a user interface of a client device, a first input from a user, where the first input includes a first text word or a first speech input. The technique further includes transmitting, via a transmit module of the client device, a portion of the first input to a server, where the server includes a language model. The technique further includes receiving, via a receive module of the client device, a first plurality of responses generated by the language model based on the portion of the first input, where each of the first plurality of the responses includes words likely to follow the first input. The technique further includes displaying, on a display of the client device, a tree structure that includes the first plurality of responses arranged into a plurality of levels. Words in a first portion of each of the first plurality of responses are included in a first level of the plurality of levels and are shown on the display. Words in a second portion of each of the first plurality of responses are included in a second level and subsequent levels of the plurality of levels and are not shown on the display. The technique further includes receiving a second input from the user, where the second input includes (i) a second text word or a second speech input entered by the user or (ii) a word selected by the user by zooming in on the words in the second level or one of the subsequent levels. The technique further includes appending the second input to the first input to obtain an upended input, transmitting a portion of the appended input to the server, receiving a second plurality of responses generated by the language model based on the portion of the appended input, and updating the tree structure based on the second plurality of responses.

A computer-implemented technique includes receiving, at a client device, an input from a user, where the input includes a text word or a speech input. The technique further includes transmitting, via the client device, a portion of the input to a server that includes a language model. The technique further includes receiving, at the client device, a plurality of responses generated by the language model based on the portion of the input, each of the plurality of the responses including words likely to follow the input. The technique further includes displaying, on a display of the client device, a tree structure that includes the plurality of responses arranged into a plurality of levels. Words in a first portion of each of the plurality of responses are included in a first level of the plurality of levels and are shown on the display. Words in a second portion of each of the plurality of responses are included in a second level and subsequent levels of the plurality of levels and are not shown on the display.

A computer-implemented technique includes receiving, at a client device, a first input from a user, where the first input includes a text word or a speech input. The technique further includes transmitting, from the client device, a portion of the first input to a server that includes a first language model and a second language model. The technique further includes receiving, at the client device, (i) a first plurality of responses generated by the first language model based on the portion of the first input and (ii) a second plurality of responses generated by the second language model based on the portion of the first input. Each of the first plurality of the responses and each of the second plurality of the responses include words likely to follow the first input. The technique further includes displaying, on a display of the client device, a first tree structure that includes the first plurality of responses arranged into a first plurality of levels, and a second tree structure that includes the second plurality of responses arranged into a second plurality of levels. Words in a first portion of each of the first plurality of responses are included in a first level of the first plurality of levels of the first tree structure and are shown on the display. Words in a second portion of each of the first plurality of responses are included in a second level and subsequent levels of the first plurality of levels of the first tree structure and are not shown on the display. Words in a first portion of each of the second plurality of responses are included in a first level of the second plurality of levels of the second tree structure and are shown on the display. Words in a second portion of each of the second plurality of responses are included in a second level and subsequent levels of the second plurality of levels of the second tree structure and are not shown on the display.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The present disclosure relates to techniques for client/server-based statistical phrase distribution display and text entry. The techniques allow a user to rapidly enter text, for example, in a search bar of a search engine, while creating a document, and so on. Text can be rapidly entered by (i) using a language model biased towards words the user is likely to type or speak; (ii) providing predictive responses in a tree structure, where responses in a first level of the tree structure are shown, and responses in subsequent levels are not shown; and (iii) allowing the user to zoom in on a level to view and select a response not shown in the level. Additionally, the techniques allow the user to test performance of a language model and to simultaneously compare multiple language models. These techniques can also be useful in displaying speech recognition lattices and translation results and allow the user to rapidly select correct recognition results or translations from a large field of potential responses.

Figure 1:
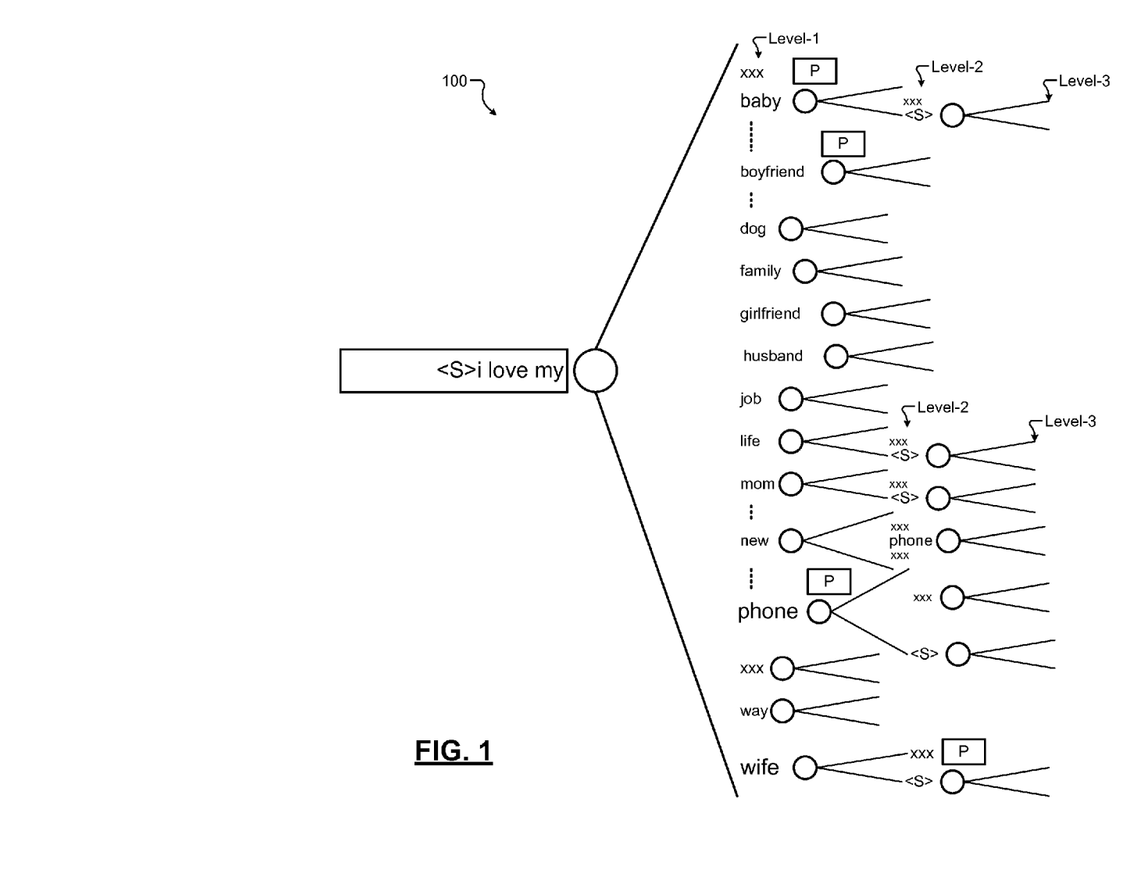
FIG. 1 depicts an example of a tree structure displayed on a client device based on responses to a user input received from a language model stored on a server according to some embodiments of the present disclosure.

More specifically, a server can include a plurality of language models for text and speech recognition. A client device can include a graphical user interface (GUI) that a user uses to input text or speech (e.g., to input "i love my" in a search bar). The client device sends a request to the server based on the input. A language model stored on the server generates responses based on one or more words input by the user. The responses can include words that are likely to follow the input (e.g., words such as baby, dog, mom, and so on that are likely to follow the input "i love my"). A portion of the input that is used to generate the responses may be highlighted on display of the client device. The responses can be displayed on the client device in the form of a tree structure (e.g., tree structure 100) as shown in FIG. 1.

Each of the responses can be subdivided into multiple levels. A first level of a response (e.g., Level-1 shown in FIG. 1) includes a first portion (e.g., a first word) of the response. The response can be further characterized by one or more words in a second level (e.g., Level-2 shown in FIG. 1), one or more words in a third level (e.g., Level-3 shown in FIG. 1), and so on. Each of the second and subsequent levels may have sublevels. Each sublevel includes a different word that is likely to follow a word in a previous level. Words in the first level of each of the responses are shown (i.e., are made visible) on the display of the client device while words in subsequent levels are not shown.

The user can use the GUI to zoom in on a level to view words not shown in the level. The user can also select words in a level by clicking on the words in the level. The selected words can be appended to the input. As words are added to the input, the client device sends one or more words from the appended input to the server, the server sends new responses, and the tree structure is dynamically updated with the new responses. The user continues to select words from the responses until a desired phrase or sentence is formed.

The words of the appended input used by the server to generate the new responses are utilized to determine a probability for each of the new responses, wherein the probability indicates how likely the user is to select each of the new responses. The size of the text in the new responses is adjusted in proportion to the probability. The text in the new responses that the user is more likely select is enlarged. Alternatively or additionally, probability values (denoted by P in FIGS. 1 and 2) are displayed adjacent to the responses.

The above technique can be used to rapidly enter text. For example, the responses can be generated using a language model biased towards phrases a user is likely to input. The user can click on words displayed in the responses. If desired words are not displayed, the user can zoom in on a level where the words can be expected. As the user zooms in, additional words and their extensions are displayed (i.e., become visible). The user can select desired words to complete a phrase or a sentence.

Further, the above technique can be used to test performance of a language model by viewing responses generated by the language model to different inputs. In addition, the above technique can be used to display lattices of speech recognition results and/or translation results, where the user can rapidly select the correct recognition result or the correct translation result from potential responses to complete phrases or sentences.

Figure 2:
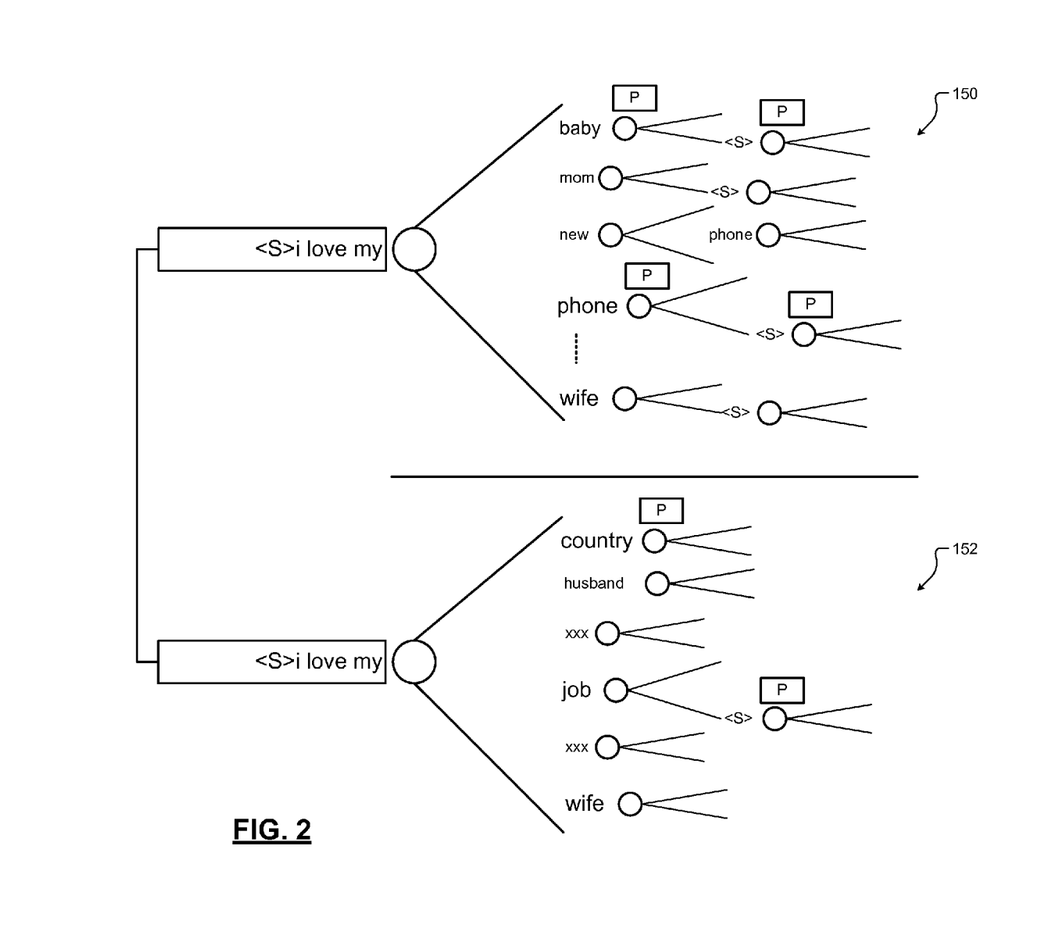
FIG. 2 depicts an example of two tree structures displayed on a client device based on responses to a user input received from two language models stored on a server according to some embodiments of the present disclosure.

The above technique can also be used to compare responses generated by two different language models to the same input. To compare, the responses generated by two different language models are displayed as two independent tree structures (e.g., tree structures 150 and 152) as shown in FIG. 2. In each tree structure, the user can use the GUI to zoom in on a level to view words and/or to select words in the level to form a phrase or a sentence using the respective language model.

Figure 3:
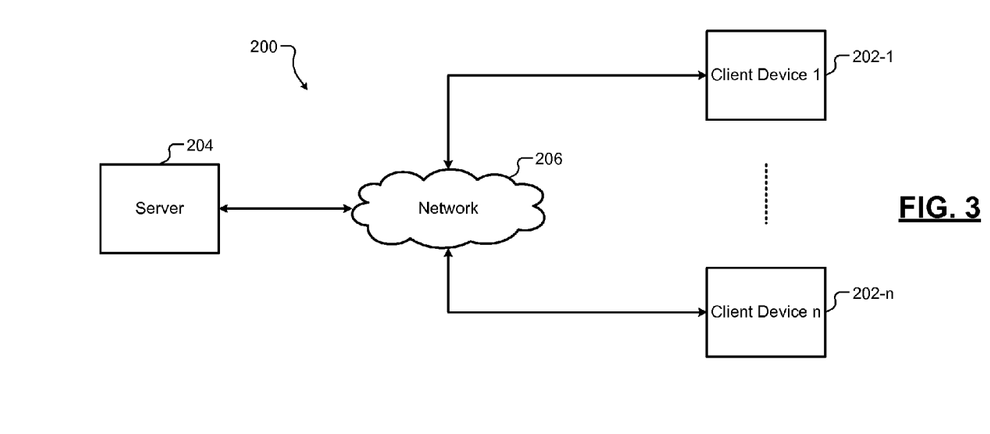
FIG. 3 depicts an example environment and components for client/server-based statistical phrase distribution display and text entry technique that includes a plurality of client devices in communication with a server via the Internet according to some embodiments of the present disclosure.

Referring now to FIG. 3, a system 200 for client/server-based statistical phrase distribution display and text entry according to the present disclosure is shown. The system 200 may include a plurality of client devices 202 (e.g., client device 1 202-1, . . . , and client device n 202-n) that can communicate with a server 204 via a network 206 such as the Internet. While only one server 204 is shown, a plurality of servers may be included and each client device 202 may communicate with more than one server 204. Further, each server 204 may include one or more language models.

The client device 202 may include any computing device, such as a personal computer (e.g., a laptop), a tablet, and a Smartphone. The client device 202 can include a graphical user interface (GUI) that generates and transmits requests, based on user input, to one or more language models stored on the server 204. For example, the client device 202 may execute a web browser that displays a search bar in which the user enters text (e.g., by typing or by speaking into a microphone of the client device 202).

The client device 202 can transmit the input or a portion of the input to the server 204 via the network 206. One or more language models stored on the server 204 can generate responses based on the input. In some implementations, the client device 202 may transmit the portion of the input to multiple servers, each storing a different language model, and may receive responses generated by the different language models from the respective servers. The responses can be presented in one or more tree structures in the browser on the client device 202 as shown in FIG. 1 or FIG. 2.

Figure 4:
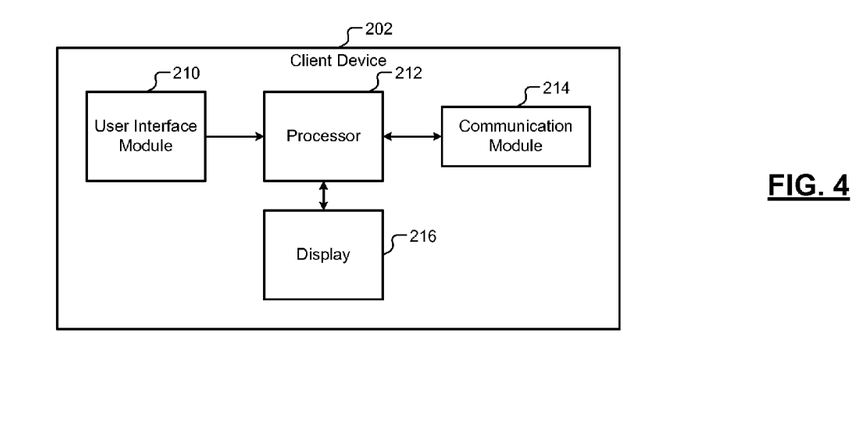
FIG. 4 depicts a functional block diagram of an example client device configured to provide client/server-based statistical phrase distribution display and text entry according to some embodiments of the present disclosure.

Referring now to FIG. 4, the client device 202 includes a user interface module 210, a processor 212, a communication module 214, and a display 216. The user interface 210 may include one or more input devices such as a mouse, a keypad, a microphone, a touch-screen, and a keyboard. The processor 212 can generate a graphical user interface (GUI) on the display 216 that the user can use to enter inputs, zooming commands, and so on. The communication module 214 communicates with the server 204 via the network 206.

The processor 212 can execute a browser and generate a GUI on the display 216 of the client device 202. The user can access and provide inputs to the server 204 using the browser and the GUI. The user enters an input (e.g., a text word or a speech input) via the user interface 210 and/or the GUI. The processor 212 processes the input and displays the input on the display 216. For example, if the user is searching the Web using a search engine, the processor 212 displays the input in a search bar on the display 216.

The communication module 214 transmits a portion of the input to the server 204 via the network 206. The server 204 can generate a plurality of responses based on a language model where the responses include words that are likely to follow the input. The server 204 transmits the plurality of responses to the client device 202 via the network 206. The communication module 214 receives the responses via the network 206.

The processor 212 can process the responses and generate a tree structure on the display 216 (e.g., see FIG. 1). Alternatively, if the user is comparing two language models stored on the server 204 (or multiple servers), the processor 212 receives a set of responses for each of the two language models and generates, based on the two sets of responses, two tree structures on the display 216 (e.g., see FIG. 2). The processor 212 can show (i.e., make visible) on the display 216 the words in the first level of each of the responses in the tree structure(s), and can hide (i.e., not show) the words in other levels. The processor 212 can also highlight on the display 216 the portion of the input that was used by the server 204 to determine a probability (or likelihood) for each potential future selection that the user may make from the predicted responses.

The user may enter additional input via the user interface 210 or the GUI. For example, the user may enter additional text via the keypad or additional speech via the microphone. Alternatively, the user may zoom in on a second or a subsequent level of the tree structure(s) using the user interface 210 and the GUI. For example, the user may use a pinch zoom function or move cursor over the levels of the tree structure(s) to zoom in on the levels. When the user zooms in on a level of the tree structure, the processor 212 can show (i.e., makes visible) the words not shown in the level. The user may select one or more of the displayed words by touching them or by clicking on them. The processor 212 can append the additional input or the one or more words selected by the user to the initial input entered by the user to obtain an appended input.

The communication module 214 transmits a portion of the appended input to the server 204. The communication module 214 receives additional responses from the language model(s) corresponding to the appended input. The processor 212 can update the tree structure(s) based on the additional responses. The user may continue the procedure until a phrase or a sentence is complete. Thus, the user can rapidly enter text, test performance (e.g., responses) of a language model, and/or compare two language models.

Figure 5:
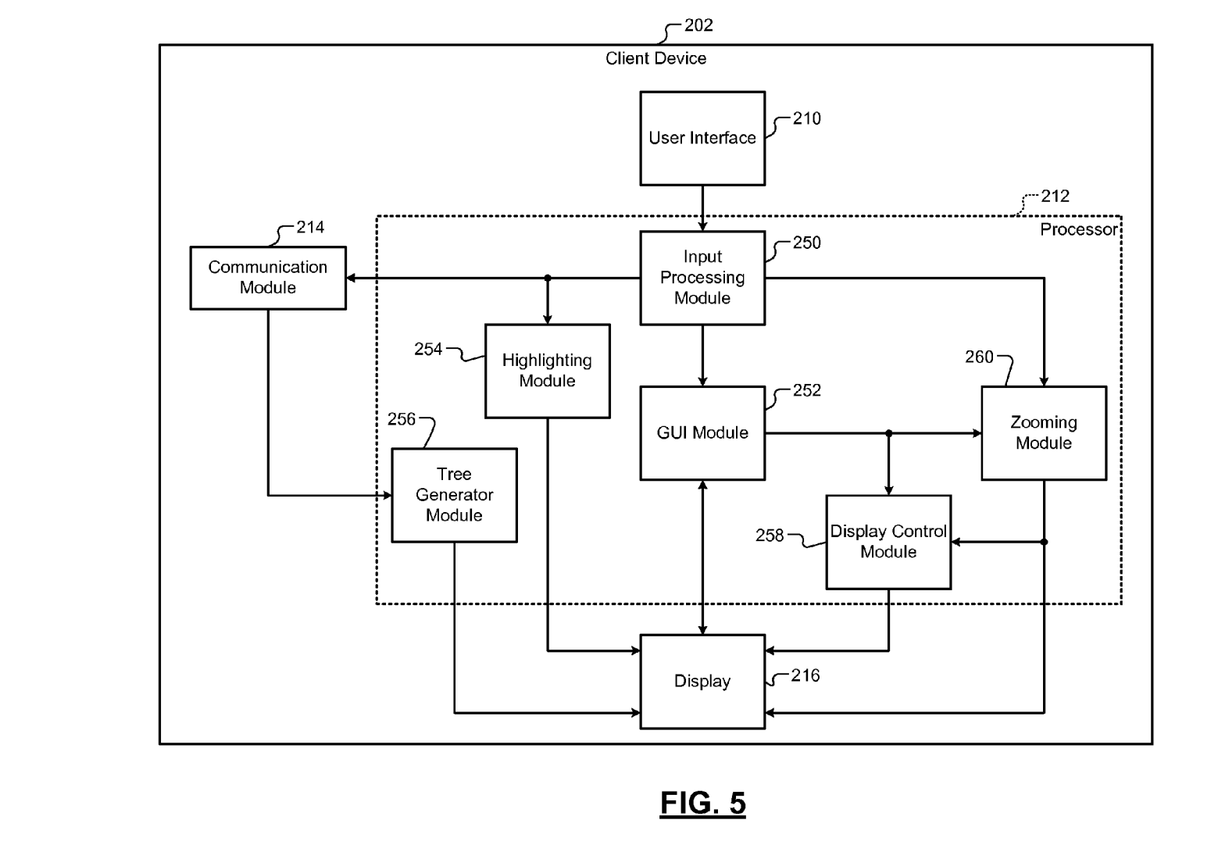
FIG. 5 depicts a functional block diagram of the example client device of FIG. 4.

Referring now to FIG. 5, the example client device 202 is shown in detail. The processor 212 includes an input processing module 250, a GUI module 252, a highlighting module 254, a tree generator module 256, a display control module 258, and a zooming module 260. The input processing module 250 processes inputs received from the user interface 210 and outputs a portion of the input to the communication module 214 for transmission to the server 204. The GUI module 252 generates a GUI on the display 216 with which the user can interact, e.g., by entering inputs, zooming in on levels of the tree structure(s), and/or selecting words from the magnified levels.

The tree generator module 256 generates one or more tree structures on the display 216 based on the responses received from one or more language models via the communication module 214. The display control module 258 can determine which words in the tree structure(s) to show (i.e., make visible) and which words in the tree structure(s) to hide (i.e., not show) on the display 216. For example, the display control module 258 may show words in the first level of each response in the tree structure(s) and hide words in the remainder of the tree structure(s).

The zooming module 260 magnifies one or more levels of the tree structure(s) on the display 216 when the one or more levels are selected by the user using the GUI (e.g., using pinch zoom control) or using the user interface 210 (e.g., using a mouse). The display control module 258 shows (i.e., makes visible) the words in the enlarged area of the tree structure(s). The user can select one or more of the visible words using the GUI or the user interface module 210. Alternatively, the user may enter additional input using the GUI or the user interface module 210. The GUI module 252 appends the selected words or the additional input to the initial input on the display 216.

The input processing module 250 outputs a portion of the appended input to the communication module 214 for transmission to the server 204. The tree generator module 256 receives additional responses from the language model(s) and updates the tree structure(s) on the display 216. The display control module 258 determines which words in the tree structure(s) to show (i.e., make visible) and which words in the tree structure(s) to hide (i.e., not show) on the display 216. The user may continue to zoom in and select additional words and/or enter additional inputs using the GUI or the user interface 210 until a phrase or a sentence is complete. Thus, the user can rapidly enter text, test performance of a language model, and/or compare two language models.

The highlighting module 254 highlights or otherwise indicates (e.g., by italicizing) a portion of the input or the appended input that is significant for each predicted phrase. For example, any word in the vocabulary can follow after any context provided by the input or the appended input. Some words, however, are predicted using more or less of the context while some words—quite unlikely sequences—are predicted irrespective of the context. The highlighting module 254 highlights words used by the server 204 to determine a probability (or likelihood) for each potential future selection that the user may make from the predicted responses. The display control module 258 adjusts the size of the text to indicate probability values. Words in the predicted responses that are more likely to be selected by the user are displayed larger. Alternatively or additionally, the probability values are displayed adjacent to the predicted responses.

Figure 6:
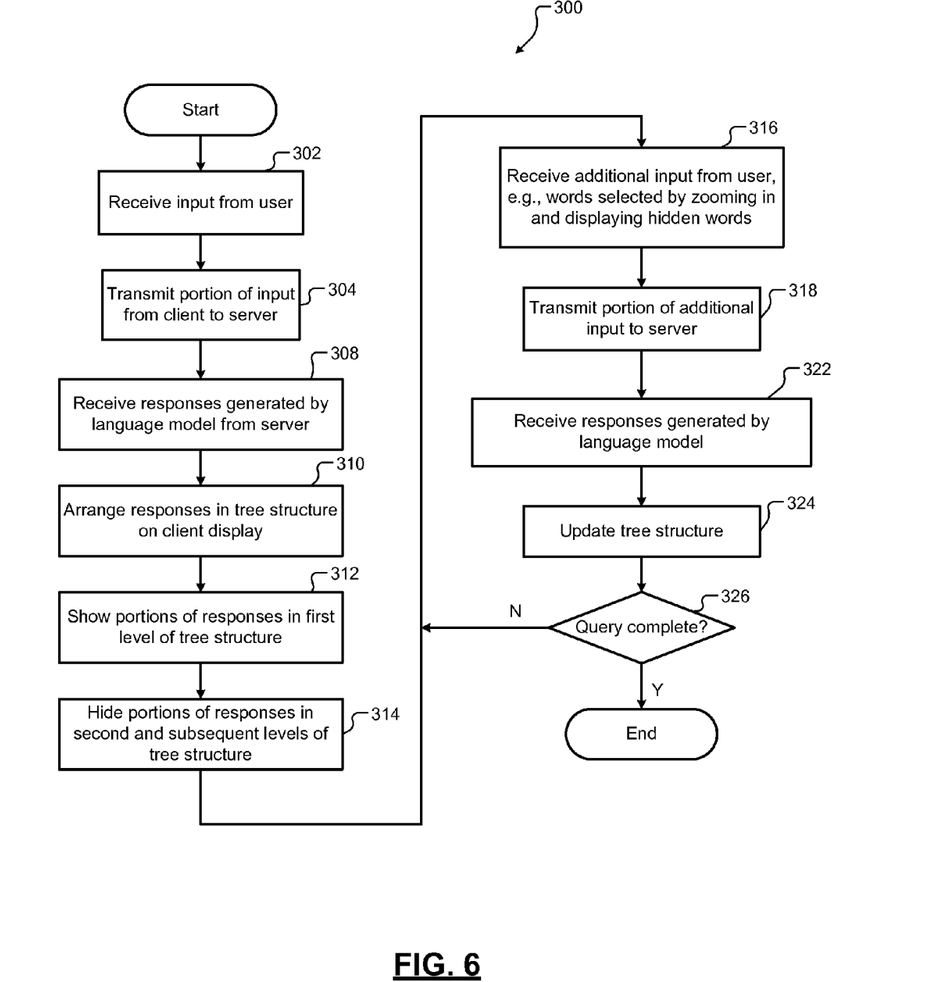
FIG. 6 is a flowchart of a technique for client/server-based statistical phrase distribution display and text entry that utilizes a language model stored on the server according to some embodiments of the present disclosure.

Referring now to FIG. 6, a technique 300 for rapidly entering text using a language model according to some embodiments of the present disclosure is shown. At 302, the processor 212 receives an input from a user via the user interface 210 of the client device 202. The input can include a text word or a speech input. At 304, the communication module 214 of the client device 202 transmits a portion of the input to the server 204. The server 204 can include a language model biased towards phrases the user is likely to input. The biased language model may be formed by adaptive machine learning.

At 308, the processor 212 receives, via the communication module 214 of the client device 202, a plurality of responses generated by the language model based on the portion of the input. Each of the plurality of the responses includes words that are likely to follow the input. At 310, the processor 212 displays on the display 216 a tree structure that includes the plurality of responses arranged into a plurality of levels. The tree structure can be as shown in FIGS. 1 and 2. At 312, the processor 212 shows (i.e., makes visible) on the display 216 the words that are included in a first level of each of the responses. At 314, the processor 212 hides (i.e., does not show) on the display 216 the words that are included in a second level and subsequent levels of each of the responses.

At 316, the processor 212 receives an additional input from the user. For example, the additional input may include an additional text word or an additional speech input entered by the user via the user interface 210. Alternatively, the additional input may include a word selected by the user by: (i) zooming in on the not shown words in the second level or one of the subsequent levels of one of the responses, (ii) displaying the not shown words, and (iii) selecting from the displayed words.

At 318, the processor 212 transmits a portion of the additional input to the server 204. In some implementations, control may append the additional input to the initial input to obtain an appended input and transmit a portion of the appended input to the server 204.

At 322, the processor 212 receives an additional plurality of responses generated by the language model based on the portion of the additional input. At 324, the processor 212 updates the tree structure based on the additional plurality of responses. The processor 212 highlights (or otherwise indicates) words in the portion of the additional input used by the server 204 to determine a probability for each potential future selection that the user may make from the predicted responses. The processor 212 adjusts the size of the text in the predicted responses that are more likely to be selected by the user. Alternatively or additionally, probability values are displayed adjacent to the predicted responses. At 326, the processor 212 determines if the query, e.g., a phrase or a sentence initiated by the user is complete. The processor 212 returns to 316 and continues processing if the query is incomplete. The processor 212 stops processing if the query is complete.

Figure 7:
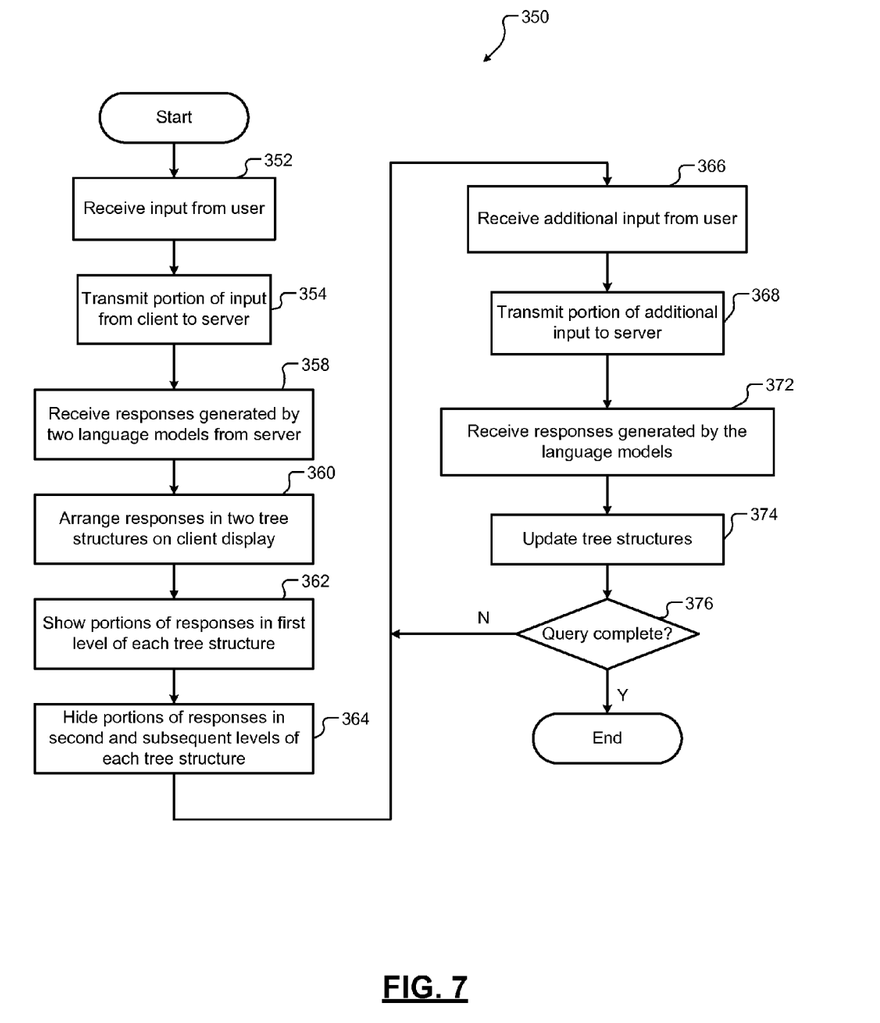
FIG. 7 is a flowchart of an example technique for client/server-based statistical phrase distribution display and text entry used to compare two language models stored on the server according to some embodiments of the present disclosure.

Referring now to FIG. 7, a technique 350 for comparing two language models according to some embodiments of the present disclosure is shown. At 352, the processor 212 receives an input from the user via a user interface 210 of the client device 202. The input can include a text word or a speech input. At 354, the processor 212 transmits a portion of the input to the server 204 via the communication module 214 of the client device 202. The server 204 can include two or more language models, e.g., first and second language models.

At 358, the processor 212 receives, via the communication module 214 of the client device 202, a first plurality of responses generated by the first language model based on the portion of the input and a second plurality of responses generated by the second language model based on the portion of the input. Each of the first and second plurality of the responses includes words that are likely to follow the input.

At 360, the processor 212 displays on the display 216 two tree structures, e.g., the first and second tree structures shown in FIG. 2. A first tree structure includes the first plurality of responses arranged into a plurality of levels. A second tree structure includes the second plurality of responses arranged into a plurality of levels. At 362, in each tree structure, the processor 212 shows (i.e., makes visible) on the display 216 the words that are included in a first level of each of the responses. At 364, in each tree structure, the processor 212 hides (i.e., does not show) on the display 216 the words that are included in a second level and subsequent levels of each of the responses.

At 366, the processor 212 receives an additional input from the user. For example, the additional input may include an additional text word or an additional speech input entered by the user via the user interface 210. Alternatively, the additional input may include a word selected by the user by: (i) zooming in on the not shown words in the second level or one of the subsequent levels of one of the responses in one of the tree structures, (ii) displaying the not shown words, and (iii) selecting from the displayed words.

At 368, the processor 212 transmits a portion of the additional input to the server 204. In some implementations, the processor 212 may append the additional input to the initial input to obtain an appended input and transmit a portion of the appended input to the server 204.

At 372, the processor 212 receives additional sets of responses generated by the language models based on the portion of the additional input. At 374, the processor 212 updates the tree structures based on the additional sets of responses generated by the respective language models. The processor 212 may optionally synchronize the tree structures so that an independent input to either language models updates both the tree structures at the same time. The processor 212 highlights (or otherwise indicates) words in the portion of the additional input used by the server 204 to determine a probability for each potential future selection that the user may make from the predicted responses. The processor 212 adjusts the size of the text in the predicted responses that are more likely to be selected by the user. Alternatively or additionally, probability values are displayed adjacent to the predicted responses. At 376, the processor 212 determines if the query, e.g., a phrase or a sentence initiated by the user is complete. The processor 212 returns to 366 and continues processing if the query is incomplete. The processor 212 stops processing if the query is complete.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A computer-implemented method comprising:
receiving, via a user interface of a client device, a first input from a user, wherein the first input includes a first text word or a first speech input;

transmitting, via a transmit module of the client device, a portion of the first input to a server, wherein the server includes a language model;

receiving, via a receive module of the client device, a first plurality of responses generated by the language model based on the portion of the first input, wherein each of the first plurality of the responses includes words likely to follow the first input;

displaying, on a display of the client device, a tree structure that includes the first plurality of responses arranged into a plurality of levels, wherein words in a first portion of each of the first plurality of responses are included in a first level of the plurality of levels and are shown on the display, and wherein words in a second portion of each of the first plurality of responses are included in a second level and subsequent levels of the plurality of levels and are not shown on the display;

receiving a second input from the user, wherein the second input includes (i) a second text word or a second speech input entered by the user or (ii) a word selected by the user by zooming in on the words in the second level or one of the subsequent levels;

appending the second input to the first input to obtain an appended input;

transmitting a portion of the appended input to the server;

receiving a second plurality of responses generated by the language model based on the portion of the appended input; and updating the tree structure based on the second plurality of responses.

2. A computer-implemented method comprising:

receiving, at a client device, an input from a user, wherein the input includes a text word or a speech input;

transmitting, via the client device, a portion of the input to a server that includes a language model;

receiving, at the client device, a plurality of responses generated by the language model based on the portion of the input, wherein each of the plurality of the responses including words likely to follow the input; and displaying, on a display of the client device, a tree structure that includes the plurality of responses arranged into a plurality of levels, wherein words in a first portion of each of the plurality of responses are included in a first level of the plurality of levels and are shown on the display, and wherein words in a second portion of each of the plurality of responses are included in a second level and subsequent levels of the plurality of levels and are not shown on the display.

3. The computer-implemented method of claim 2, further comprising:

receiving, at the client device, an additional input from the user;

transmitting, from the client device, a portion of the additional input to the server;

receiving, at the client device, an additional plurality of responses generated by the language model based on the portion of the additional input; and updating, at the client device, the tree structure based on the additional plurality of responses.

4. The computer-implemented method of claim 3, wherein the additional input includes at least one of (i) an additional text word or an additional speech input entered by the user, and (ii) a word selected by the user by zooming in on the words in the second level or one of the subsequent levels of one of the plurality of responses.

5. The computer-implemented method of claim 2, further comprising:

receiving, at the client device, a command from the user to zoom in on the second level or one of the subsequent levels of one of the plurality of responses; and displaying, on the display of the client device, the words in the second level or one of the subsequent levels of the one of the plurality of responses.

6. The computer-implemented method of claim 5, further comprising:

receiving, at the client device, a selection of one of the words displayed in the second level or one of the subsequent levels of the one of the plurality of responses;

appending, at the client device, the one of the words to the input to obtain an appended input;

transmitting, from the client device, a portion of the appended input to the server;

receiving, at the client device, an additional plurality of responses generated by the language model based on the portion of the appended input; and updating, at the client device, the tree structure based on the additional plurality of responses.

7. The computer-implemented method of claim 2, further comprising:

distinguishing on the display the portion of the input that is used by the server to determine a probability for each of the plurality of responses indicating how likely the user is to select each of the plurality of responses; and indicating the probability by (i) altering size of the words shown on the display in proportion to the probability or (ii) including the probability adjacent to each of the plurality of responses shown on the display.

8. The computer-implemented method of claim 2, wherein the language model is biased towards phrases the user is likely to input.

9. The computer-implemented method of claim 2, further comprising:

receiving, at the client device, a second plurality of responses generated by a second language model included in the server based on the portion of the input, wherein each of the second plurality of the responses includes a second set of words likely to follow the input; and displaying, on the display of the client device, a second tree structure that includes the second plurality of responses arranged into a second plurality of levels, wherein words in a first portion of each of the second plurality of responses are included in a first level of the second plurality of levels and are shown on the display, and wherein words in a second portion of each of the second plurality of responses are included in a second level and subsequent levels of the second plurality of levels and are not shown on the display.

10. The computer-implemented method of claim 9, further comprising:

receiving, at the client device, an additional input from the user, the additional input including an additional text word or an additional speech input entered by the user;

transmitting, from the client device, a portion of the additional input to the server;

receiving, at the client device, a third plurality of responses generated by the language model based on the portion of the additional input;

receiving, at the client device, a fourth plurality of responses generated by the second language model based on the portion of the additional input; and updating, at the client device, the tree structure based on the third plurality of responses and the fourth plurality of responses.

11. The computer-implemented method of claim 9, further comprising:
receiving, at the client device, a command from the user to zoom in on the second level or one of the subsequent levels of one of the plurality of responses; and
displaying, on the display of the client device, the words in the second level or one of the subsequent levels of the one of the plurality of responses.

12. The computer-implemented method of claim 9, further comprising:
receiving, at the client device, a command from the user to zoom in on the second level or one of the subsequent levels of one of the second plurality of responses; and
displaying, on the display of the client device, the words in the second level or one of the subsequent levels of the one of the second plurality of responses.

13. The computer-implemented method of claim 10, further comprising:
distinguishing on the display the portion of the additional input that is used by the server to determine a probability for each of the third and fourth plurality of responses indicating how likely the user is to select each of the third and fourth plurality of responses; and
indicating the probability by (i) altering size of the words shown on the display in proportion to the probability or (ii) including the probability adjacent to each of the third and fourth plurality of responses shown on the display.

14. A computer-implemented method comprising:
receiving, at a client device, a first input from a user, wherein the first input includes a text word or a speech input;
transmitting, via the client device, a portion of the first input to a server that includes a first language model and a second language model;
receiving, at the client device, (i) a first plurality of responses generated by the first language model based on the portion of the first input and (ii) a second plurality of responses generated by the second language model based on the portion of the first input, wherein each of the first plurality of the responses and each of the second plurality of the responses include words likely to follow the first input; and
displaying, on a display of the client device, a first tree structure that includes the first plurality of responses arranged into a first plurality of levels, and a second tree structure that includes the second plurality of responses arranged into a second plurality of levels,
wherein words in a first portion of each of the first plurality of responses are included in a first level of the first plurality of levels of the first tree structure and are shown on the display,
wherein words in a second portion of each of the first plurality of responses are included in a second level and subsequent levels of the first plurality of levels of the first tree structure and are not shown on the display,
wherein words in a first portion of each of the second plurality of responses are included in a first level of the second plurality of levels of the second tree structure and are shown on the display, and
wherein words in a second portion of each of the second plurality of responses are included in a second level and subsequent levels of the second plurality of levels of the second tree structure and are not shown on the display.

15. The computer-implemented method of claim 14, further comprising:
receiving, at the client device, a second input from the user including an additional text word or an additional speech input entered by the user;
appending, at the client device, the second input to the first input to obtain an appended input;
transmitting, from the client device, a portion of the appended input to the server;
receiving, at the client device, a third plurality of responses generated by the first language model based on the portion of the appended input;
receiving, at the client device, a fourth plurality of responses generated by the second language model based on the portion of the appended input; and
updating, at the client device, the first tree structure based on the third plurality of responses and the fourth plurality of responses.

16. The computer-implemented method of claim 14, further comprising:
receiving, at the client device, a command from the user to zoom in on the second level or one of the subsequent levels of one of the first plurality of responses; and
displaying, on the display of the client device, the words in the second level or one of the subsequent levels of the one of the first plurality of responses.

17. The computer-implemented method of claim 14, further comprising:
receiving, at the client device, a command from the user to zoom in on the second level or one of the subsequent levels of one of the second plurality of responses; and
displaying, on the display of the client device, the words in the second level or one of the subsequent levels of the one of the second plurality of responses.

18. The computer-implemented method of claim 14, further comprising synchronizing the first and second tree structures so that inputs to either of the first and second language models update both the first and second tree structures.

19. The computer-implemented method of claim 15, further comprising
distinguishing on the display the portion of the appended input that is used by the server to determine a probability for each of the third and fourth plurality of responses indicating how likely the user is to select each of the third and fourth plurality of responses; and
indicating the probability by (i) altering size of the words shown on the display in proportion to the probability or (ii) including the probability adjacent to each of the third and fourth plurality of responses shown on the display.

20. The computer-implemented method of claim 14, further comprising comparing performance of the first language model relative to the second language model by comparing at least one of the words in the first portion of each of the first plurality of responses to at least one of the words in the first portion of each of the second plurality of responses.

* * * * *